United States Patent [19]

Fifer

[11] 4,262,960
[45] Apr. 21, 1981

[54] VEHICLE WINDOW ASSEMBLY

[75] Inventor: William J. Fifer, Riverview, Mich.

[73] Assignee: Ford Motor Company, Dearborn, Mich.

[21] Appl. No.: 971,972

[22] Filed: Dec. 21, 1978

[51] Int. Cl.³ ............................................. B60J 1/02
[52] U.S. Cl. .............................. 296/84 R; 296/84 D;
296/93; 52/718
[58] Field of Search ............ 296/146, 84 R, 93, 84 D; 52/717, 718, 397, 401, 208

[56] References Cited

U.S. PATENT DOCUMENTS

| | | | |
|---|---|---|---|
| 3,611,663 | 10/1971 | Andrey | 52/397 |
| 4,147,005 | 4/1979 | Meyer | 52/397 |

*Primary Examiner*—Robert R. Song
*Attorney, Agent, or Firm*—John J. Roethel; Clifford L. Sadler

[57] ABSTRACT

A vehicle window assembly 12 having a window glass 14 bonded to a window frame 15, resilient clip devices 23 interposed between the glass and frame, and a reveal molding 16 retained by the clip devices. The clip devices 23 locate and support the glass in the frame during the setting and curing of the bonding material 22 and hold the reveal molding 16 against a marginal portion of the glass. The reveal molding conceals the gap between the periphery of the glass and the frame and the clip devices located in the gap.

2 Claims, 4 Drawing Figures

VEHICLE WINDOW ASSEMBLY

BACKGROUND OF THE INVENTION

This invention relates to motor vehicle window assemblies, and especially to resilient clip devices used to position a window glass in a window frame and to retain a reveal molding around the peripheral margin of the glass.

As noted in U.S. Pat. No. 3,611,633, issued Oct. 12, 1971 to M. Andrey for "Device for Mounting an Embellishing Element Around a Fixed Window of a Vehicle," when a window glass is adhesively mounted in a window opening in a vehicle body, there is created a gap between the peripheral edge of the glass and the peripheral wall of the body structure framing the window opening. This gap is usually covered by an ornamental molding, known as a reveal molding. It has been conventional practice to retain this molding in place by means of small metal or plastic clip devices that have snap fit engagement with headed studs welded to the body sheet metal.

U.S. Pat. No. 3,611,663 discloses a plastic clip device that in one embodiment is constructed and arranged so that a part of the clip device must be forced through the gap between the glass and frame wall edges after the glass is set into the window frame, the clip device then being engageable by the reveal molding flanges or lip portions to retain the reveal molding in place. In a second embodiment, the plastic clip devices are pre-positioned and then self-retained on the edge of the glass prior to the installation of the glass in the window opening. When the glass is set into the window opening, the clip devices are permanently retained in place and ready to receive the coacting portions of the reveal molding. The use of either of these clip devices eliminates the operation for welding the studs to the body, an operation that frequently results in improperly placed or seated studs, and a further operation for placing the clip devices on the studs.

It is believed readily apparent, however, that in case of the first embodiment, the operation of forcing the clip device under the glass edge could present some difficulties if the glass is not properly set in the window opening so that there is a sufficient gap to receive the clip device or if there is any delay in the insertion of the clip device so that the bonding adhesive will firmly set, thus restricting any freedom of movement of the glass to enable the clip device to be properly positioned at the edge of the glass. In the case of the second embodiment, the pre-positioning and self-retention of the clip devices before the glass is placed in the window opening could result in the clip devices becoming dislodged during the handling of the glass as it is moved into position relative to the window frame. Replacement of the dislodged clip devices could result in a loss of time in the assembly operation, and the failure to replace the dislodged clip devices could result in improper retention of the reveal molding at final assembly.

SUMMARY OF THE INVENTION

The present invention relates to a vehicle window assembly comprising a window frame having a peripheral wall portion and a flange extending into the window opening from one edge of the wall portion. A window glass is adhesively bonded to the flange with its peripheral edge in spaced relationship to the wall portion. Resilient clip devices are interposed between the glass edge and the wall portion.

Each clip device has a pedestal means seated on the wall portion with one end thereof contiguous to the flange. The pedestal means has a pair of oppositely extending, upwardly inclined arms with an edge of each arm abutting the flange. Each arm terminates in an upstanding flange having an edge thereof extending from its frame flange abutting edge downwardly toward the arm to form a support ramp for an adjacent edge of the glass. A pair of retainer prongs project beyond the end of the pedestal means opposite the end of the latter contiguous to the frame flange in substantially parallel relation to the wall portion of the frame. An appendage means projects upwardly from the pedestal means and extends beyond the peripheral edge of the glass supported on the support ramp on each arm flange.

Each clip device is functional to retain an elongated reveal molding in abutting relation to a marginal edge portion of the glass. The reveal molding has at each of its longitudinal edges a retention lip. One of the retention lips is hooked over the upper end of the appendage means and the other retention lip is engaged between the retainer prongs and the wall portion whereby the reveal molding is retained in position to conceal the marginal edge of the glass and the gap or space between the latter and the wall portion.

The resilient clips embodying the present invention have the advantage that they may be positioned around the window frame prior to the glass being positioned in the window opening. If the panel receiving the window glass is placed in a substantially horizontal position before the glass is dropped into the window opening, the clip devices may be freely positioned around the frame as desired. If the panel receiving the glass is at an angle to the horizontal when the glass is positioned in the window opening, it may be necessary to place the clip device on the frame flange and wall portion with a thin coating of adhesive to hold the clip devices in place as the glass is dropped into the window opening. In any event, the inclined support ramps on the clip device arms assist in positioning the glass within the window opening and to support it there until the adhesive bonding the glass to the frame has had an opportunity to cure or set. The reveal molding may then be engaged with the clip devices for retention at the marginal edge portion of the glass.

DESCRIPTION OF THE DRAWINGS

The invention is hereafter particularly described with reference to the accompanying drawings, in which.

DETAILED DESCRIPTION OF THE INVENTION

Figure 1:
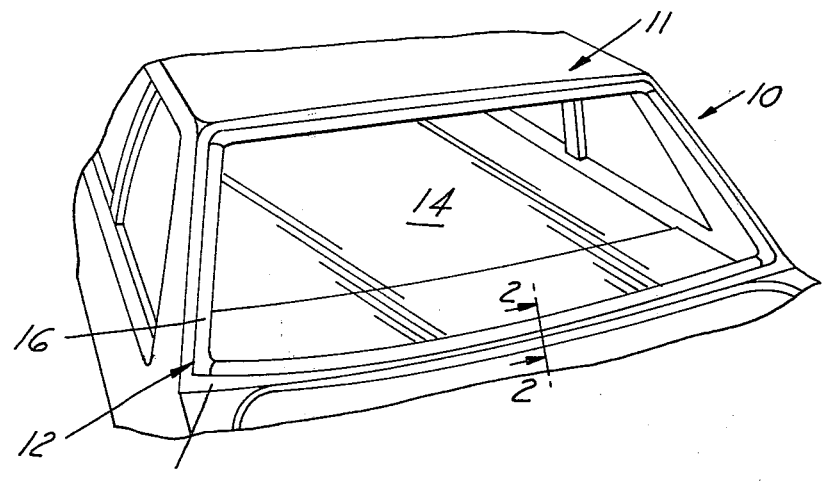
FIG. 1 is a fragmentary rear perspective view of a vehicle body embodying the window assembly of the present invention.

Referring now to the drawings, FIG. 1 shows a portion of an automobile body 10 having a roof structure 11 with a rear window assembly 12 in its back panel 13. The window assembly 12 comprises a window glass 14, a frame 15 and a reveal molding 16. The frame 15 is an integral part of the roof structure back panel 13 and consists of a peripheral wall portion 17 and a pinch weld flange 18 that extends into the window opening from the interior edge 19 of the wall portion 17, see FIG. 2. The glass 14 is bonded to the outer or exterior surface 21 of the flange 18 by means of a vulcanizing bead 22, such as a polysulfide rubber compound.

A plurality of one-piece, resilient plastic clip devices, generally designated 23, are conveniently spaced around the window opening. If the back panel 13 is held in a substantially horizontal position prior to the installation of the glass 14, the clip device may be loosely positioned on the frame 15. Otherwise, it may be necessary to adhesively tack the clip devices in position to receive the glass panel 14. These clip devices 23 (only one of which is shown) are interposed between the peripheral edge 24 of the glass 14 and the frame 15 are intended to serve two functions: first, to locate the glass during the setting and curing of the bonding material 22; and second, to hold the reveal molding 16 in place at final assembly.

Figure 2:
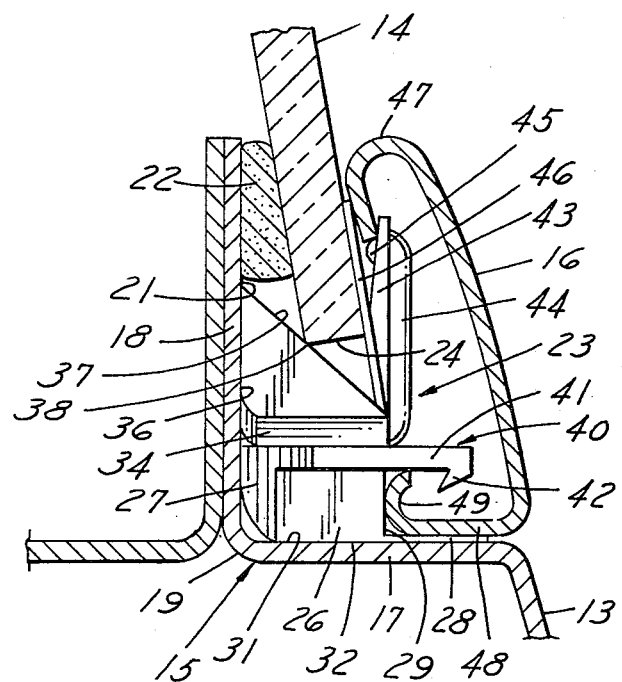
FIG. 2 is an enlarged cross section view taken substantially on the line 2—2 of FIG. 1.
Figure 3:
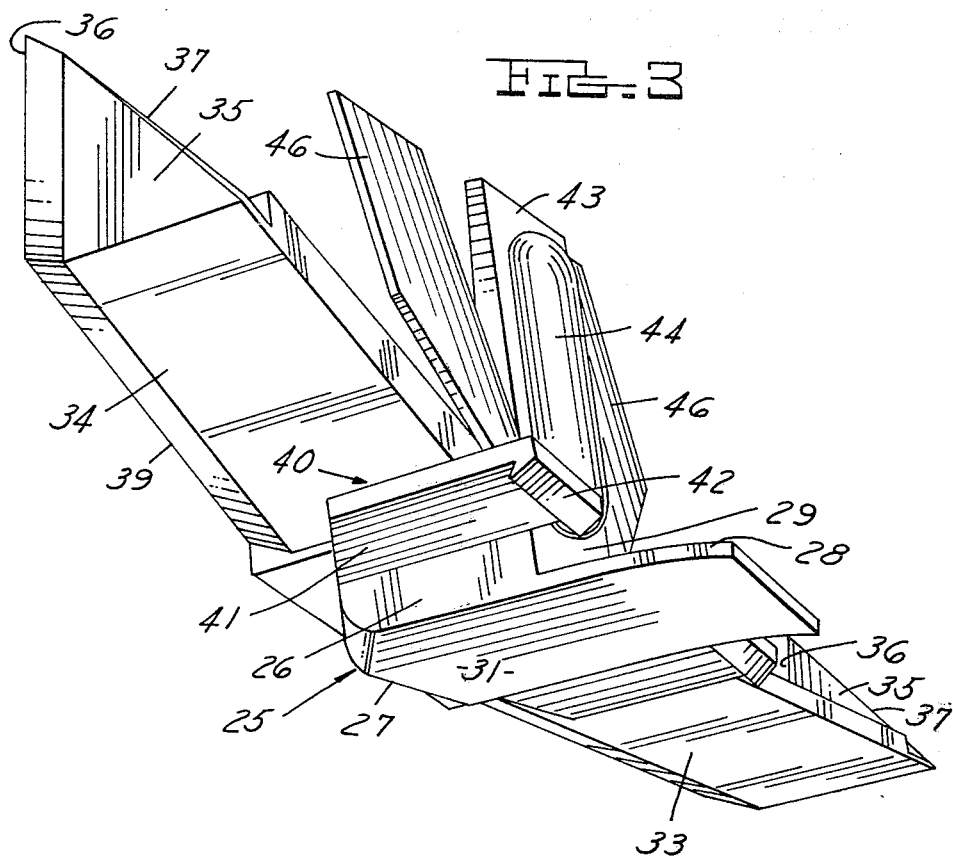
FIG. 3 is an enlarged perspective view of a clip device according to the present invention.
Figure 4:
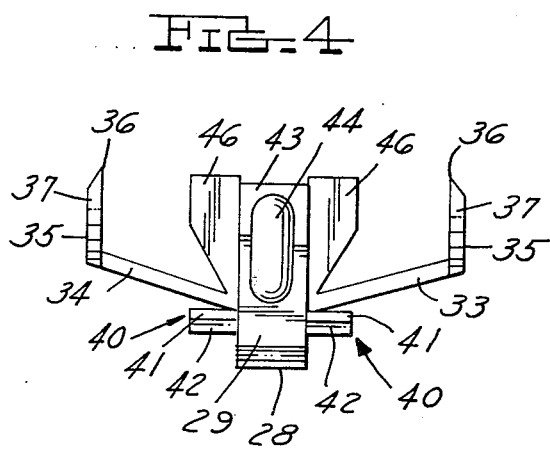
FIG. 4 is a front elevational view of the clip device.

Each clip device 23 has a centrally located pedestal 25 comprising a substantially cubiform body 26 having a tapered nose portion 27 at one end and a thin, downwardly curved appendage 28 extending from its opposite end 29. In use, the base 31 of the pedestal body 26 is seated on the surface 32 of the peripheral wall 17 of the window frame and the tapered nose portion 27 is positioned in contiguous or abutting relation to the exterior surface 21 of the flange 18, see FIG. 2. Extending from each upper side edge of the pedestal body 26 are arms 33 and 34, respectively, see FIG. 4. These arms 33-34 are canti-levered to the pedestal body 26 and extend upwardly at a slight inclination. Each arm 33-34 terminates in an upstanding flange 35. As best seen in FIGS. 3 and 4, each flange 35 is substantially triangular with a vertical leg 36 positioned to abut the surface 21 of the flange 18 of the frame 15 and the hypotenuse 37 of the triangle extending downwardly toward the exterior of the frame 15 in position to underlie the corner 38 of the peripheral edge 24 of the glass 14.

The edge 39 of each arm 33-34, the edge 36 of each arm flange 35, and the tip of the nose portion 27 of the pedestal body lie in a substantially common plane. All contact the surface 21 of the pinch weld flange 18 when the weight of the glass 14 is supported on the support ramps formed by the inclined edges 37 of the arm flanges 35. Since the support ramps are inclined, the clip devices 23 are able to accommodate variations in glass and frame dimensions, as well as variations within limits of the accuracy of the placement of the window glass in the window openings of vehicles moving down a vehicle assembly line. The construction and arrangement of the clip devices 23 as described thus far provides for the first mentioned function of the clip devices, i.e., the location of the glass during the setting and curing of the bonding material 22.

The second function has to do with the retention of the reveal molding around the glass peripheral margin. To provide for the retention of the reveal molding, each clip 23 has a pair of retainer prongs 40. Each retainer prong 40 comprises a finger 41 integrally attached to a side of the pedestal body 26 immediately below the respective arms 33-34. Each finger 41 projects outwardly beyond the end 29 of the pedestal body 26 about one-third as far as the projection of the thin wall appendage 28. Each finger 41 terminates in a downwardly depending hook portion 42.

Projecting upwardly from the pedestal body 26 at the end 29 of the latter between the prongs 40 is a retention finger or appendage 43. On its exterior side, the retention finger 43 is provided with an elongated stiffener bead or rib 44, and on the interior side near the upper edge, with a stop nib or button 45. Flanking the retention finger 43 at each side of the latter are a pair of thin, flexible flaps 46 that in assembled position of the clip 23 lie flat against the glass surface.

The retainer prongs 40 and the retention finger 43 coact to retain the reveal molding 16 in position at the marginal portion of the glass 14. As best seen in FIG. 2, the reveal molding 16 has a button-hook or inverted U-shaped lip 47 along its upper longitudinal edge and an inwardly turned flange 48 having a reversely coiled lip 49 on its lower longitudinal edge. In assembly, the button-hook lip 47 of the molding 16 is hooked over the upper end of the retention finger 43 and is pulled down into engagement with the stop nib 45. The flaps 46 on each side of the retention finger insulate the glass surface from contact by the reveal molding 16. The lower end of the reveal molding 16 is pushed inwardly toward the frame flange 18 so that the coiled lip 49 snaps under the hook portions 42 of the retainer prongs 40 into abutting relation to the end 29 of the clip pedestal body 26. The flange 48 on the lower edge of the reveal molding 16 is isolated from the frame wall 17 by the appendage 28 projecting from the lower end of the pedestal body 26. The appendage 28 thus functions as an anti-squeak pad between the reveal molding flange 48 and the frame wall 17 surface.

It is believed readily apparent the use of the clip devices 23 is not limited to a vehicle body rear window assembly, but they also may be used for a front or windshield window assembly, or any assembly of a fixed window glass in an equivalent frame structure.

It will be understood that the invention is not to be limited to the exact construction shown and described, but that various changes and modifications may be made without departing from the spirit and scope of the invention, as defined in the appended claims.

I claim:

1. A vehicle window assembly, comprising:
    a window frame having a peripheral wall portion and a flange extending into the window opening from one edge of the wall portion,
    a window glass adhesively bonded to the flange with its peripheral edge in spaced relationship to the frame wall portion;
    a resilient clip device interposed between the glass edge and the frame wall portion,
    the clip device having a pedestal means seated on the wall portion with one end thereof contiguous to the flange;
    the pedestal means having a pair of oppositely extending, upwardly inclined arms wiith an edge of each arm abutting the frame flange,
    each arm terminating in an upstanding flange having an edge thereof extending from a frame flange abutting edge downwardly toward the arm to form a support ramp for an adjacent edge of the glass,
    a pair of retainer prongs projecting beyond the end of the pedestal means opposite the end of the latter contiguous to the frame flange in substantially parallel relation to the wall portion,
    an upstanding appendage projecting from the pedestal means and overlapping the marginal surface of the glass;

and an elongated reveal molding having at each of its longitudinal edges a retention lip, one of the retention lips being hooked over the appendage and the other retention lip being interposed between the retainer prongs and the wall portion whereby the reveal molding is retained in position to conceal the marginal edge of the glass and the space between the latter and the wall portion, the upstanding appendage being reinforced against lateral bending by an elongated rib extending down the exterior side thereof, and the appendage having on its interior side a stop means controlling the extent to which the one molding retention lip may be hooked over the end thereof.

2. A vehicle window assembly according to claim 1, in which:

a pair of thin wall flaps extend from the pedestal means in the same direction as the appendage and along each side of the latter, the flaps being positioned to lay flat against the exterior surface of the glass and to be interposed between the reveal molding and the glass to isolate the two from each other.

* * * * *